Aug. 29, 1950  R. RUDENBERG  2,520,813
ELECTRON OPTICAL SYSTEM
Filed Dec. 10, 1947  3 Sheets-Sheet 1

INVENTOR
REINHOLD RUDENBERG
BY Pennie, Edmonds,
Morton and Barrows
ATTORNEYS

Aug. 29, 1950 R. RUDENBERG 2,520,813
ELECTRON OPTICAL SYSTEM
Filed Dec. 10, 1947 3 Sheets-Sheet 2
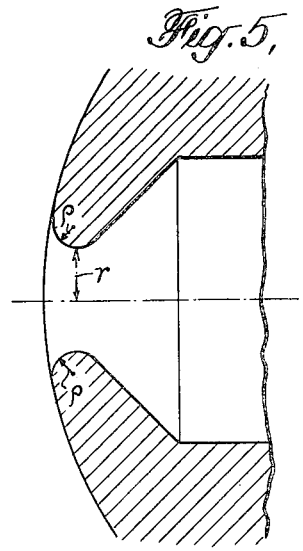
Fig. 5,
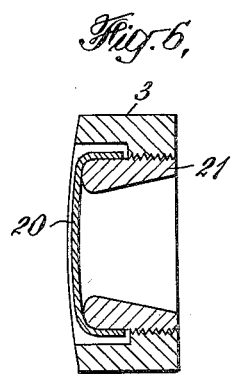
Fig. 6,
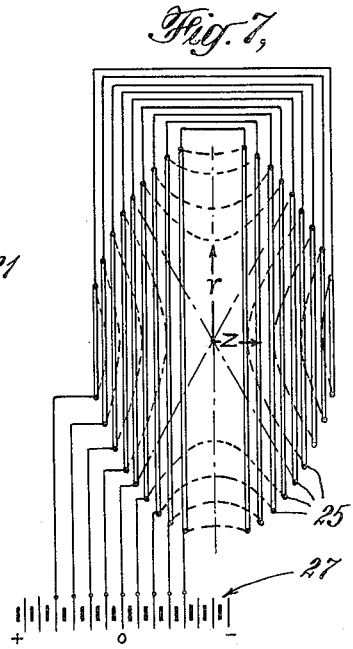
Fig. 7,
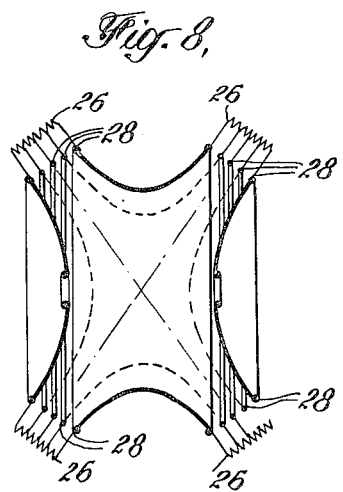
Fig. 8,
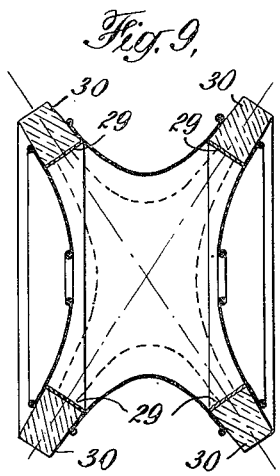
Fig. 9,
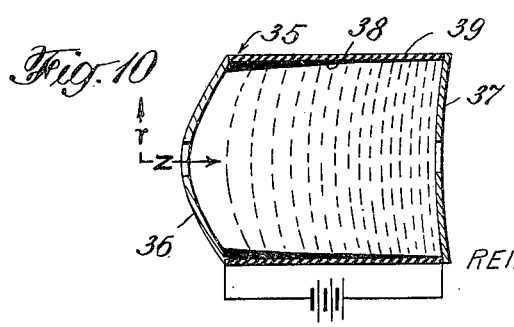
Fig. 10
INVENTOR
REINHOLD RUDENBERG
BY Pennie, Edmonds,
Morton and Barrows
ATTORNEYS Aug. 29, 1950    R. RUDENBERG    2,520,813
ELECTRON OPTICAL SYSTEM Filed Dec. 10, 1947    3 Sheets-Sheet 3

INVENTOR
REINHOLD RUDENBERG
BY Pennie, Edmonds,
Morton and Barrows
ATTORNEYS

Patented Aug. 29, 1950

2,520,813

UNITED STATES PATENT OFFICE 2,520,813

ELECTRON OPTICAL SYSTEM

Reinhold Rudenberg, Belmont, Mass.

Application December 10, 1947, Serial No. 790,873

31 Claims. (Cl. 250—49.5)

This invention relates to electron optical systems and more especially to electron lenses having a minimum of aperture defects.

It is well-known that beams of electrons may be brought to a more or less perfect focus by means of electric or magnetic fields produced by electrically or magnetically charged structures which are termed electron lenses. The electron lenses heretofore used have suffered from defects similar in effect to the aberrations encountered in light optics. These defects have restricted the apertures used in electron optical instruments and have prevented full realization of the potentialities of electrons as imaging agents.

A condition under which the rays of an electron beam whose electrons are moving with substantially uniform velocity will be brought to a sharp focus independent of the distance of the individual rays in the beam from the beam axis consists, in the case of a beam having axial symmetry, in the provision of a field characterized by a direct proportionality between the radial component of field strength and the distance from the axis of the beam. The condition of proportionality is also the criterion for producing a true line focus of a beam of two-dimensional extension perpendicular to the direction of propagation. The "axis" of such a beam may be considered to be a plane parallel to the direction of propagation and bisecting the cross-section of the beam parallel to one of the sides thereof. For focusing such a beam the proportionality condition to be imposed upon the field strength in the lens is to be a proportionality with distance from this axial plane.

The present invention supplies a type of field fulfilling this condition of proportionality and supplies method and means for producing it.

Both electric and magnetic fields may be produced of this type, having the qualities necessary to bring beams of electrons to a point focus with a minimum of "aperture defects" traceable to the finite width or aperture of the beam, without restriction to beams of paraxial rays nor to thin or weak lenses. In the case of beams having a two-dimensional extension instead of symmetry about a line-axis, fields may be generated which will bring such beams to a line focus, similarly free of aperture defects. The invention is equally applicable to beams of positive as of negative particles of electricity, and to beams of electrically charged particles of matter, positive or negative.

In the case of axial symmetry, perhaps the one most frequently encountered in practice, the condition of proportionality is satisfied by a field, the derivative of whose potential function with respect to radial displacement from the axis is proportional to that displacement. Physically this condition is satisfied by a field in which the equipotential surfaces are constituted by two families of conjugate hyperboloids of revolution, both asymptotic to a single cone of generating angle $$\tan^{-1}\sqrt{2}$$

In use the electron lens producing this hyperbolic field may be positioned with respect to the source of electrons so that the rotational axis of the hyperboloids coincides with the axis of the beam to be focused.

According to my invention I provide electron lenses consisting of two or more electrodes or pole pieces which are shaped, located and charged electrostatically or magnetically to potentials which will produce within a space substantially enclosed by these electrodes or poles a field of this configuration.

The electron lenses of my invention are of course finite in size and produce a field which has boundaries, in particular boundaries transverse to the axis of the beam to be focused. My invention provides means whereby the field produced by the electrodes or poles of the lens is maintained in close conformity with the desired hyperboloidal configuration out to the limit of the physical lens structure at both axial and extra-axial points, and whereby the discontinuities and disturbing effects at the limits of the field where the beam enters and leaves the lens are held to a minimum.

The invention will be more fully understood by reference to the following detailed description which is to be taken in conjunction with the accompanying drawings in which:

Fig. 1 is a plot in a meridian plane of an electromagnetic or electrostatic field of axial symmetry, which fulfills the condition of proportionality between radial component of field strength and distance from the axis;

Fig. 2 is a plot, in a plane parallel to the intended direction of propagation and perpendicular to the intended line focus, of an electromagnetic or an electrostatic field fulfilling the condition of proportionality between the component of field strength normal to an axial plane bisecting the beam lengthwise and the displacement from that plane, such a potential field being adapted to bring a beam of two-dimensional cross-section to a line focus;

Fig. 5 is an enlarged view of one of the lateral electrodes or poles of a lens such as is shown in Fig. 3 or 4, showing the profile thereof in the region of the axial apertures which permit ingress and egress of the electron beam to the active lens space;

Fig. 6 is a sectional view in elevation of an electron-transparent window having a conductive surface, adapted to be inserted in the axial apertures of the lens of Fig. 3;

Fig. 7 is a sectional view in elevation of an electrostatic lens composed of hetero-potential rings;

Fig. 8 is a sectional view in elevation of an electrostatic lens composed of a combination of equipotential hyperboloidal surfaces and heteropotential rings;

Fig. 9 is a sectional view in elevation of an electrostatic electron lens in which the potential at points between the equipotential hyperboloidal surfaces at the physical limits of the lens is held to the correct values by means of semi-conducting sheets;

Fig. 10 is a sectional view in elevation of an asymmetrical electrostatic electron lens;

The condition of proportionality applicable to the electron beam of axial symmetry which will insure point focusing thereof may be expressed in cylindrical coordinates $r$, $z$ as $$e_r = -\frac{\delta \phi}{\delta r} = pr \quad (1)$$

In Equation 1 $r$ is the radial coordinate measured from the axis $z$ of cylindrical coordinates, $e_r$ is the radial component of field strength, $\phi$ is the potential of the field which produces $e_r$, and $p$ is a constant. $e_r$ and $\phi$ are either electrostatic or electromagnetic, according as the field is electrostatic or electromagnetic.

A field which satisfies the condition of Equation 1 is given by $$\phi = p\left(z^2 - \frac{r^2}{2}\right) \quad (2)$$

$z$ being the coordinate measured along the axis. $z$ has positive and negative values measured from a chosen origin. If $\phi$ is fixed in Equation 2, the locus of the equation is the locus of points of constant potential $\phi$. This locus is a hyperboloid of revolution about the $z$-axis, asymptotic to a cone of generating angle $$\tan^{-1}\sqrt{2}$$

i. e. approximately 54° 44′. The hyperboloid is unparted or biparted according as, for positive $p$, $\phi$ is negative or positive, or according as, for negative $p$, $\phi$ is positive or negative. This may be seen by considering the trace of the equipotential surface of Equation 2 in a meridian plane. In rectangular coordinates $z$, $r$ in such a plane, Equation 2 is the equation of a hyperbola. If $p$ and $\phi$ are both positive or both negative the transverse axis of the hyperbola is the $z$-axis; the major and minor axes are respectively $$\sqrt{\frac{2\phi}{p}} \quad \text{and} \quad \sqrt{\frac{4\phi}{p}}$$

and the eccentricity is $$\sqrt{3}$$

The asymptotes are therefore inclined to the $z$-axis at the angle whose secant equals $$\sqrt{3}$$

or whose tangent equals $$\sqrt{2}$$

i. e. approximately 54° 44′. If either $\phi$ or $p$ is negative and the other positive, the hyperbola is conjugate to that produced when both are of the same sign and the major and minor axes are interchanged. The eccentricity of the conjugate hyperbolas is $$\sqrt{\frac{3}{2}}$$

In a given field $p$ is constant throughout and only $\phi$ changes in sign and magnitude.

Figure 1:
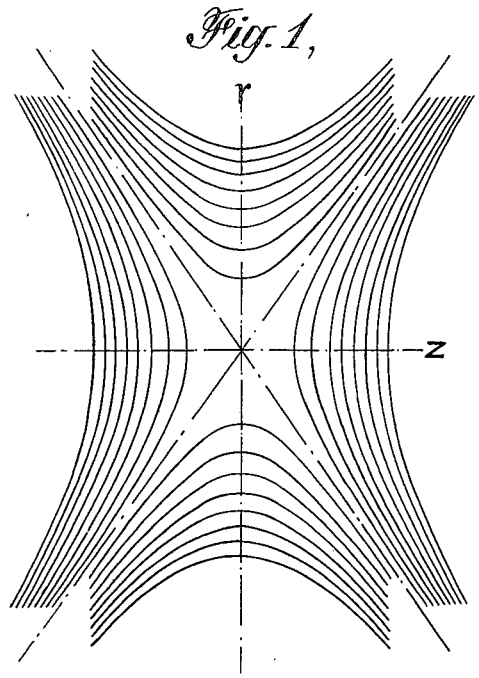

In Fig. 1 are plotted the traces in a meridian plane of a few members of the two families of equipotential surfaces which satisfy Equation 2. For the sake of generality the plot is for successive values of $\phi/p$, in which however only $\phi$ changes from surface to surface. The significance of the constant $p$ will be more fully explained below. Thus Fig. 1 is a plot of the traces in a meridian plane of the equipotential surfaces of the desired field. The origin of coordinates lies at the vertex of the asymptotic cone. The asymptotic cone, including its vertex, constitutes the locus of points of zero potential in the field. A positive value of the constant $p$ results in a positive potential on the lateral or biparted hyperboloids along the $z$-axis on both the left- and right-hand sides of Fig. 1, and in a negative potential on the annular or unparted hyperboloids along $r$ surrounding the $z$-axis. The radial field strength is thus positive throughout the field and the axial field strength is negative for positive $z$'s and positive for negative $z$'s. Such a field will act as a converging field on a beam of electrons propagated along the $z$-axis. The opposite sign for the field constant $p$ will interchange the signs of the potential and field strength in the three regions of the field marked out by the asymptotic cone and will produce a diverging effect on the electron beam.

The radial field strength in the field of Fig. 1 is given by Equation 1 as $$e_r = pr$$

and the axial field strength is $$e_z = -2pz \quad (3)$$

Hence as far as this field extends the radial field strength is proportional to the radius at every point and therefore the condition of freedom from aperture defects is properly fulfilled within the field. All the individual rays of the uniform electron beam thus will converge toward or diverge from the same focal point no matter how wide the beam is.

Furthermore, the axial field strength is not dependent on the radial but only on the axial coordinate. Hence at any axial location the increment of axial velocity of the electrons due to the lens field will be the same over the entire cross-section of the electron beam, assuming the field to be limited on either side by radial planes. A beam consisting of individual electron rays of uniform axial velocity over the beam cross-section thus will retain this monokinetic property throughout the entire extent of the field. Lenses as heretofore used show a dependence of the axial field strength on the radius, thus accelerating individual rays distant from the axis differently than paraxial rays. Therefore they render polykinetic even a beam which was uniform in axial velocity upon entering the lens.

In the case of the beam of two-dimensional cross-section the condition of proportionality necessary to insure line focusing of the beam may be expressed in rectangular coordinates $z, x$ as $$e_x = -\frac{\delta\phi}{\delta x} = 2px \qquad (4)$$

Here $p$ again represents a constant for the field representative of the intensity and sign of the field. A potential which satisfies this desired condition is given by $$\phi = p(z^2 - x^2) \qquad (5)$$

Equation 5 is the equation of the desired field in a plane perpendicular to the desired line focus in which the coordinates of the two-dimensional case are measured. A field according to Equation 5 will produce perfect electric or magnetic lens action analogous to that of cylindrical lenses of light optics. The equipotential surfaces represented by Equation 5 for various substituted values of $\phi$ are hyperbolic cylinders whose directrices are rectangular hyperbolas. Their asymptotes are a pair of planes intersecting each other at right angles and inclined at 45° to the axial plane which bisects the beam lengthwise. A plot of the trace of the two families of these hyperbolic cylinders in the coordinate plane is shown in Fig. 2, again for various fixed values of $\phi/p$.

Figure 3:
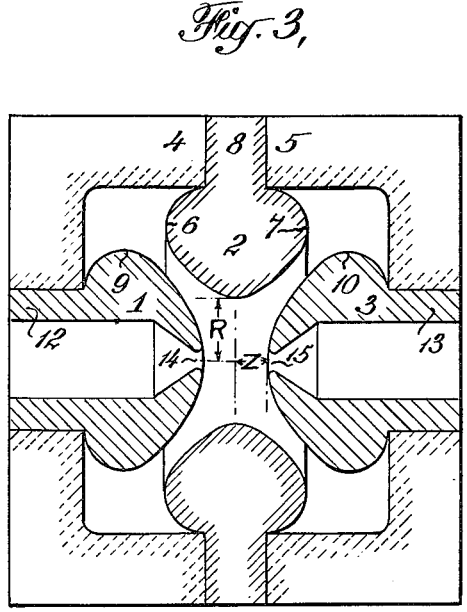
Fig. 3 is a sectional view in elevation of an electrostatic lens according to my invention.

A structure which produces a field satisfying the proportionality condition of Equation 1 required to eliminate aperture defects from the point focus of an axially symmetrical beam is shown in Fig. 3. Fig. 3 is a section in a meridian plane of an electrostatic lens of axial symmetry. The lens is composed of three electrodes 1, 2 and 3 supported in the desired spatial relation by insulating rings 4 and 5. The electrodes are made of a conductive material so that their surfaces may be surfaces of equipotential. The electrodes 1 and 3 are shaped to present to each other surfaces in the form of the two sheets of a biparted hyperboloid of revolution as indicated in Fig. 1, and the electrode 2 is shaped in the form of an unparted hyperboloid of revolution. The hyperboloids to which the electrodes 1, 2 and 3 conform are asymptotic to cones of generating angle $$\tan^{-1}\sqrt{2}$$

and the insulating rings 4 and 5 are dimensioned to support and three electrodes so that the two hyperboloids have the same axis of revolution and the same origin, i. e. their asymptotic cones coincide.

The annular electrode 2 conforms on its inner side to an unparted hyperboloid of revolution except as it is curved at the regions 6 and 7 into a surface of large radius of curvature to connect the hyperboloidal surface to a supporting portion 8. The electrodes 1 and 3 which provide lateral termination to the field are likewise hyperboloidal in shape in the area of the two which face each other except at the regions 9 and 10 at the limit of the field where they are similarly curved with a gentle curvature to connect the hyperboloidal portion of their surface with the supporting portions 12 and 13. In addition, of course, the lateral electrodes 1 and 3 must be provided with axial apertures 14 and 15 to accommodate the electron beam to be focused.

The electrodes 1 and 3 are charged to one potential and electrode 2 is charged to another potential. In the application of such a lens to an electron microscope, for example, the difference in potential applied between the electrodes may be that which is applied between the cathode and the electrodes 1 and 3, which perform the function of accelerating the electrons in the beam. If the potential applied to the electrode 2 is negative with respect to the potential applied to the electrodes 1 and 3, the lens will act as a converging lens for electrons or negatively charged particles, bringing the rays of such a beam which enter the lens from one side to a real focus on the other side of the lens. If the relative polarity of the electrodes is reversed, the lens will function as a diverging lens for negative rays, so that the rays of the incident beam will diverge on the exit side of the lens as if from a virtual focus.

The apertures 14 and 15 should be small in order to distort the hyperbolic field inside the lens as little as possible. Whatever their size these apertures produce an additional field of their own, dependent among other things on the profile of the lateral electrodes near these apertures as seen in section in a meridian plane. This profile should not be too sharp, i. e. the apertures should not be bounded by the edges of thin sheets, since this would produce a strong concentration of the field near the edge of the aperture. This would result in a more than proportional rise in field strength with displacement from the axis in the vicinity of the beam. On the other hand apertures which connect the inside of the lens with the outside by means of tubes long in comparison to their diameter would have the opposite effect. A close approximation to the proportionality condition may be achieved in the apertures by making the profile of the electrodes in the neighborhood of the apertures approximately of the form of a semi-circle convex towards the axis and tangent at the side towards the center of the lens to the hyperbola which generates the surface of the electrode at points away from the aperture. This construction is shown in Fig. 5, where the radius of this semi-circle is denoted as $\rho.\rho$ should be less than or equal to $r/2$ where $r$ is the minimum radius of the aperture itself. The criterion $r/2$ follows from the radius of curvature possessed at its intercept on the $r$-axis by the hyperbola which generates the unparted hyperboloid of the annular electrode. The limitation that $\rho$ shall be less than rather than more than $r/2$ is the result of a surface aberration which develops at the finite lateral limits of the field.

If the electrodes 1 and 3 are made to conform in their hyperboloidal portions to the two sheets of the same biparted hyperboloid, as shown in Fig. 3, the lens will be symmetric. For an electrostatic lens this means that the total change of potential experienced by the electrons between the entrance to the lens and the $z=0$ plane will be equal to the total change in potential experienced by the electrons in passing from the $z=0$ plane to the exit side of the lens. Thus the electrons will suffer no net axial acceleration.

It has been stated that the desired field is characterized by equipotential surfaces having the form of hyperboloids of revolution asymptotic to a cone of generating angle $$\tan^{-1}\sqrt{2}$$

(or in the two-dimensional case, hyperbolic cylinders generated on rectangular hyperbolas). Nothing has been specified however as to the separation of successive hyperboloids or hyperbolic cylinders differing by given increments of potential. The separation of successive hyperboloids for given potential increments, although it differs from point to point over their surfaces and from hyperboloid to hyperboloid, expresses the over-all strength or intensity of the field. This strength or intensity should not of course be confused with the strict conception of field strength or electric intensity which is a point function throughout the field. This over-all intensity is a measure of the "strength" or refracting power of the lens as a whole, converging or diverging, and is represented in the analytic definition of the field by the constant $p$. The refracting power of the lens, in the optical sense, of course depends also upon its axial length, i. e. the axial length over which the desired field is provided, as well as upon this "strength."

Given the constant $p$, however, the field to be provided is determined. The physical significance of the constant $p$ may be visualized as follows. Assume a positive value for $p$ and call respectively R and Z the intercepts in the $r$ and $z$ axes of the hyperbolas which generate the unparted and biparted hyperboloids to which the electrode 2 and 1 and 3 conform. Then the electrodes 1 and 3 must by Equation 2 each be charged to a potential $\phi_Z = pZ^2$. Correspondingly, the electrode 2 must be charged to a potential $\phi_R = -pR^2/2$. These potentials are referred to the potential at the origin as zero potential. The electrodes may be charged to these potentials by applying between them a voltage $$E = \phi_Z - \phi_R = p(Z^2 + R^2/2)$$

Otherwise stated, if the total difference of potential available for application to the lens is E, the constant $p$ which characterizes the lens with this applied difference of potential E, will be $$p = \frac{E}{Z^2 + \frac{R^2}{2}} \quad (6)$$

If a large difference of potential E is available $p$ will have a large value; the lens so used will be "strong" and will, for electrons incident with a given energy, converge the beam to a short focus. In practice it will often be desirable to design the structure of the lens so as to employ an available potential E on hyperboloidal electrodes as closely spaced as the limitations of voltage breakdown will permit. That is, the intercepts Z and R are made as small as is consistent with the insulation and discharge factors.

The important dimensions for a lens made up of hyperboloidal surfaces are therefore the axial intercepts of the hyperbolas to whose hyperboloids the electrodes or poles of the lens conform. The minimum diameter of the annular or unparted hyperboloid at its "throat" is twice the intercept of its hyperbola and is therefore 2R. The distance between the vertices of the sheets of the lateral or biparted hyperboloids to which the lateral electrodes conform and the vertex of the asymptotic cone is in each case equal to the intercept of the hyperbola to whose hyperboloid the lateral electrode in question conforms. This intercept may be called Z. If the lateral electrodes conform to the two sheets of a single biparted hyperboloid, Z is the same for both and the distance between their vertices is 2Z. The effective length of the lens is determined by 2Z and this measures the axial distance over which the electrons in their flight will be subjected to the focusing action of the lens. The distance out the asymptotes along which the electrodes are carried is determined by the requirements for minimizing distorting effects in the active portion of the lens due to the finite extent of the electrodes and by the contrary requirement of maintaining adequate minimum separation of electrodes between which the lens voltage is applied and which approach each other as they are carried out the asymptotes. The "active" portion of the lens may be considered to be roughly the right circular cylindrical volume whose radius is R and whose altitude is 2Z. A number of expedients will be described below for providing a correct termination to the lens in the region between the annular and the lateral electrodes at the left and right limits thereof.

In the construction of a lens according to Fig. 3 the choice of hyperboloids to which the electrodes are made to conform, i. e. the choice of Z and R for the lens, is dependent upon the lens voltage available for application between the annular electrode on the one hand and the two lateral electrodes on the other, upon the velocity of electrons as they enter the lens upon the focal length desired and other quantities. The focal length of a symmetrical electrostatic converging lens can be determined as $$f = \frac{\sqrt{2}B\sqrt{1+\left(\frac{Z}{B}\right)^2}}{\sin\left[\sqrt{2}\sinh^{-1}\frac{Z}{B}\right]} \quad (7)$$

In Equation 7 B is a constant of the lens denoting a length dimension which is given for symmetrical lenses by $$B = \sqrt{\frac{E_v}{E}\left(Z^2 + \frac{B^2}{2}\right) - Z^2} \quad (8)$$

in which E is the potential difference applied between the lateral electrodes of $z$-axis intercepts Z and $-Z$ and the annular electrode of $r$-intercept R, and $E_v$ is the axial electron voltage of the incident beam.

It is often desirable to make $f$ as small as possible. Because of the requirements of voltage security however the physical dimensions of the lens cannot be made indefinitely small. Whatever values are chosen for Z and R, the minimum spacing of the electrodes across which the lens voltage E will be applied may be several times smaller than either Z or R. That is to say, the hyperboloidal electrodes may be extended some distance out along the asymptotes. In the case of the unipotential lens wherein $E_v=E$, and therefore $$B=R/\sqrt{2}$$

the focal length $f$ is at a minimum with respect to Z when $$Z=0.63R \qquad (9)$$

The minimum is rather broad, however, and focal lengths close to the shortest which can be attained with my given R with result if Z is held within the limits 0.2R and 1.5R.

One means of avoiding or minimizing the residual aberrations in the focusing action of electrostatic lenses according to the present invention which arise from departures from the hyperbolic condition in the field produced by the axial apertures is to close these apertures with thin conducting sheets of the same or nearly the same hyperboloidal shape as the lateral electrodes to which they belong. These sheets or foils should of course be as nearly as possible transparent to the electrons of the beam. A window of this type is shown in Fig. 6. The window consists of a self-supporting metallic foil 20 lightly stretched over a threaded annular plug 21 for which provision may be made in the apertures of lateral electrodes 1 and 3 of Fig. 3. Or the window may consist of a metallic surface coating deposited on a film of insulating material of low density. Preferably the conducting and insulating materials should be chosen from those which impress no substantial structure upon the electron beam. For this purpose the metals antimony, chromium and the insulators collodium or glass are suitable.

Figure 2:
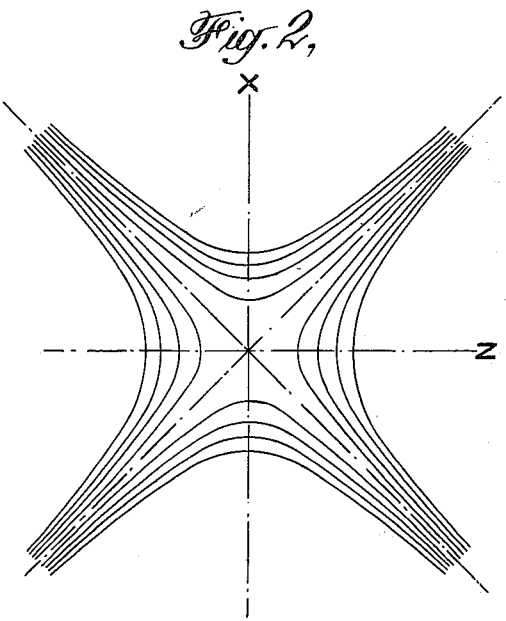
Figure 4:
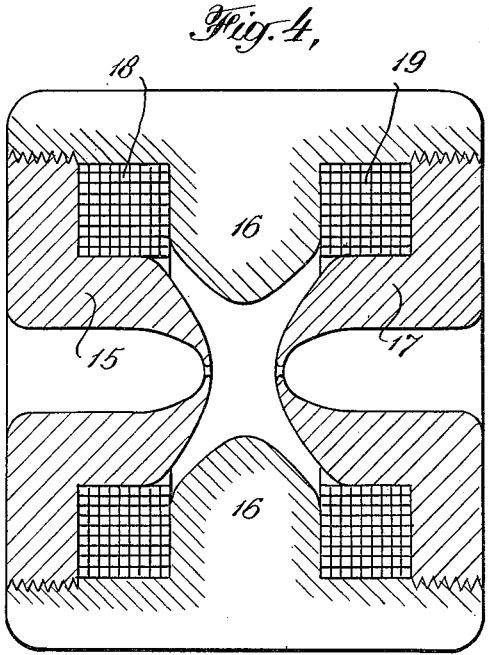
Fig. 4 is a sectional view in elevation of an electromagnetic lens according to my invention.

The fields described in Figs. 1 and 2 may, of course, be either electrostatic or electromagnetic and the invention is applicable to electromagnetic as well as electrostatic lenses. Fig. 4 indicates the arrangement of a magnetic lens of axial symmetry producing the required hyperbolic field. Three poles 15, 16 and 17 made of magnetically permeable material are shaped hyperboloidally in the same way as the electrodes 1, 2 and 3 of the electrostatic lens of Fig. 3. A hyperbolic field is established within the volume of revolution which is essentially enclosed by these hyperboloidal surfaces by means of energizing coils 18 and 19 which create a common difference of magnetic potential between the annular pole 16 and the two lateral poles 15 and 17. The pole 16 is magnetically connected to the other poles in the region outside the energizing coils so that a magnetic circuit is provided which is closed except for the gap between the hyperboloidal surfaces. The same considerations as to choice of hyperboloids, axial dimensions and apertures apply as in the case of the electrostatic lens. Instead of exciting the lens by electric current a permanent magnetization of the magnetic circuit may be used. For this purpose the circuit should be constructed of highly coercive steel.

The hyperbolas of Fig. 1 have at their intercepts on the $r$- and $z$-axes respectively radii of curvature of $r/2$ and $2z$. The corresponding radii of curvature on the axis and at the $z$-0 plane of hyperbolas which generate the surfaces of the electrodes of Figs. 3 and 4 are $R/2$ and $2Z$. Since in the immediate vicinity of the intercepts the hyperbolis follow to a good approximation circles of these radii, a simplification of the lenses tolerable for many purposes will be achieved if the electrodes are made to conform in these regions to surfaces generated by the revolution about the $z$-axis of circles of radius $2Z$ with their centers on the $z$-axis and, at distances $3Z$ from the origin and of a circle of radius $R/2$ with its center on the $r$-axis and at the distance $3R/2$ from the origin.

R and Z may be chosen at will according to the criteria above discussed and the circles which are to generate the electrode surfaces will be determined thereby. In particular Z may be different for the two lateral electrodes. The lateral apertures will be as before so that the surface of the lateral apertures will be as before so that the surface of the lateral electrodes presented to the beam and to the active lens space will be a combination of toroidal and spherical surfaces. The spherical portion of the surface of the lateral electrodes and the toroidal surface of the annular electrode may be merged into continuous surfaces of convenient shape. These may be cones, for example, parallel to the asymptotic cone of the hyperbolic field of Equation 2 or they may be simply the surfaces of radial disks.

It is not necessary to use equipotential surfaces to produce the electric field of Equation 2 which is shown in Fig. 1. Structures bearing no resemblance to hyperboloidal surfaces may be used, provided only that they have symmetry with respect to the intended axis of the lens and provided that their component parts are charged to the electrostatic potentials required of their positions by Equation 2. In Fig. 7 is shown a sectional view in elevation of an electrostatic lens of minimum aperture defects according to the condition of Equation 1. It consits of a series of electrically conducting rings 25 concentrically supported about an axis by convenient insulating means. Each ring is charged from a source of potential difference such as a battery 27 to the potential defined for its radial and axial location by Equation 2. As will subsequently be more fully explained there is no limitation on the position of the origin of the axial coordinate, which may or may not be at the midpoint of the axial length of the array of rings. The nearer the rings are to each other on a surface surrounding the active lens space, the more exactly the ideal field will be produced. The cross-section of the rings may be circular or rectangular, influencing only to a small degree the field in the immediate neighborhood of the rings. If approximately equal voltage increments between adjacent rings are desired along with substantially equal physical separation of the rings, the rings may conform, in the case of a symmetrical lens having equal extension along the positive and negative $z$-axes, approximately to the outline of an ellipsoid as shown in Fig. 7. They may however all be of the same diameter, in which case their axial spacing will be prescribed by the variation in voltage along the length of a cylinder interposed in the field of Fig. 1. The axial distribution of the voltage over the rings will in this case follow Equation 2, with $r$ held constant, so that with constant axial spacing of the rings the voltage will vary quadratically.

In the case of a lens in which the field is established by means of hyperboloidal equipotential surfaces the faithfulness with which the field follows that of Fig. 1 may be improved for a given extension of the hyperboloids out their asymptotes by means of hetero-potential rings 28 mounted in the annular spaces between the hyperboloidal electrodes at the extremities of the electrodes. Such a construction is shown in sectional elevation in Fig. 8. The rings 28 are held at the potentials specified for their positions by Equation 2 by means of taps connected to voltage dividing resistors 26. This construction permits a convenient reduction in the over-all dimensions of the lens and thus increases for a given lens voltage the required minimum physical separation of the electrodes between which this lens voltage is applied. The voltage security of the lens is thus improved.

The function of the hetero-potential rings in the lens of Fig. 8 may also be performed by semi-conducting sheets formed into essentially conical surfaces arranged between the lateral and annular electrodes out at their extremities. The distribution of potential along these sheets required according to Equation 2 is maintained by the use of a proper voltage drop along the radial direction of the sheets and can be adjusted by proper choice of the resistance of the sheet as a function of its radial and axial extension. Since the equipotential surfaces near the asymptotes of the field structure are nearly equidistant as shown in Fig. 1, a uniformly conducting high resistance sheet may be used for this purpose. Referring to Fig. 9, semi-conducting coatings 29 of this uniform resistance property are provided on the inner surface of two insulating rings 30 provided between the annular hyperboloidal electrode 2 and the lateral electrodes 1 and 3.

For the exertion of a perfect lens effect on the electron beam it is not necessary to employ a structure symmetric in the $z=0$ plane of Fig. 1. If an asymmetric portion of the field is employed, there will result in the electrostatic case a net acceleration in the axial direction, positive or negative. In the magnetic case of Fig. 4 a net rotation of the beam about the $z$-axis will result. If such an acceleration or rotation of the beam is wanted, it is desirable to use for the lens a portion of the field of Fig. 1 located entirely on one side or the other of the $z=0$ plane. Any of the structures heretofore discussed may be employed for this purpose, choosing only for the various electrodes or poles the potentials prescribed for them by Equation 2, with the origin of $z$-coordinates lying outside the limits of the lens structure by the desired amount. If the lens is to be terminated laterally by hyperboloidal equipotential surfaces they will of course have curvature of the same sign and will conform to sheets of separate hyperboloids of different scale, but always of the same shape or eccentricity prescribed by the asymptotic cone of 54° 44'. In Fig. 10 is shown a sectional view in elevation of an asymmetrical electrostatic lens in which a field according to Equation 2 is established by means of a cylindrical electrode 35 and hyperboloidal end plates 36 and 37. Whereas the hyperboloidal end plates are surfaces of constant potential and are therefore made of conductive material, the cylindrical electrode 35 has a potential distribution along its length varying quadratically and is therefore made up of a semi-conducting coating 38 of properly graduated thickness applied to the inside of an insulating tube 39. Apertures concentric with the axis of the lens are provided and these may be dimensioned according to the criteria previously developed for minimizing aperture aberrations or covered, in the case of electrostatic lenses, with transparent conducting windows of the type shown in Fig. 6.

Figure 11:
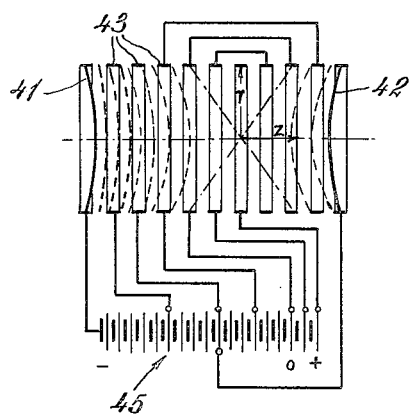
Fig. 11 is a sectional view in elevation of an electrostatic electron lens composed of a combination of hyperboloidal equipotential surfaces and hetero-potential rings.

Fig. 11 illustrates the use of a combination of hyperboloidal equipotential surfaces and hetero-potential rings to form an asymmetric lens. The portion of the field according to Equation 2 which is used, is laterally terminated on both sides by conductive hyperboloidal electrodes 41 and 42, while the cylindrical boundary around the axis is formed by a number of rings 43 supported coaxially with the common axis of revolution of the electrodes 41 and 42.

The scale of the hyperboloids to which the electrodes 41 and 42 are shaped, and the voltages to which they and the ring-electrodes 43 are charged, depend upon the portion of the field of Equation 2 which it is desired to provide. In terms of Fig. 1 and Equation 3, this portion is determined by the intercepts on the $z$-axis or axis of symmetry, of the hyperbolas to whose hyperboloids the electrodes 41 and 42 are shaped.

The radius of the ring-electrodes 43 is chosen large enough to render negligible over the cross-section of the beam to be focused the effect of the discontinuous variation of voltage along the radial boundary of the field, which these discrete rings provide.

In Fig. 11 the lens is shown as asymmetric, extending farther to the left than to the right of the origin of $z$-coordinates, which is a point of zero potential. The axial distribution of voltage over the rings follows a quadratic law, as may be seen by making $r$ a constant in Equation 2. A source of potential difference such as a battery 45 is provided and connections to the electrodes 41, 42 and 43 are made therewith to conform to this quadratic condition. It will be noted that the point of zero potential on the battery is connected to the two ring-electrodes 43 which intersect the asymptotic cone, shown in dotted lines. The left-hand equipotential electrode 41 may be used, partially or entirely as emitting surface, and the right-hand electrode 42 as receiving surface of an electron beam of large diameter.

Figure 12:
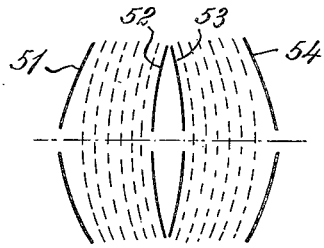
Fig. 12 is a trace in a meridian plane, of the surfaces to which conform the electrodes or poles of a compound electron lens of axial symmetry.

It may be advantageous to use for the focusing of an electron beam a combination of two or more hyperbolic fields of the type defined in Equation 2. The separate fields may differ simply in the portion of the field defined by Equation 2 which is employed, or portions of fields of different intensity constants $p$ may be employed. The separate fields may be produced by any of the combinations of electrodes or poles heretofore discussed, aligned upon a common axis. Such a combination of fields produces a compound lens. Fig. 12 shows the trace in a meridian plane of the limiting surfaces of the electrodes of such a compound lens. It is composed of four hyperboloidal electrodes 51, 52, 53 and 54, all made of conductive material and maintained at the separate desired potentials. For example, the electrode 52 may be maintained at a potential positive with respect to that of electrode 51 as required by Equation 2, applied separately to define a field for the space enclosed between these electrodes. The right-hand portion of the lens may have electrode 54 positive with respect to the electrode 53 so that both portions will provide an axial acceleration for electrons incident from the left. If the electrodes 52 and 53 are chosen to conform to hyperboloids far out from the origin of $z$-coordinates for the respective fields, they will be nearly plane in shape. If then their potentials are made equal these two electrodes can be eliminated from the lens without seriously impairing the nature of the compound hyperbolic field in the space enclosed by the electrodes 51 and 54.

Figure 13:
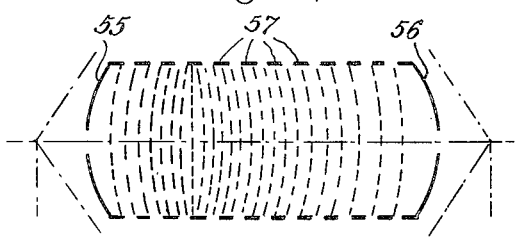
Fig. 13 shows a modification of the lens of Fig. 12.

In Fig. 13 is shown a compound electrostatic lens in which dissimilar portions of separate hyperbolic fields have been axially connected. The lateral electrodes will bound the field at hyperboloidal surfaces 55 and 56 which are however of dissimilar scale, although both generated by hyperbolas having the necessary eccentricity $$\sqrt{3}$$

The compound field of the lens of Fig. 13 is terminated radially by means of a series of electrically charged rings 57 coaxial with the common axis of revolution of the hyperboloidal end electrodes 55 and 56 and charged to the necessary potentials defined by Equation 2 as separately applied to the two portions of the lens space.

Figure 14:
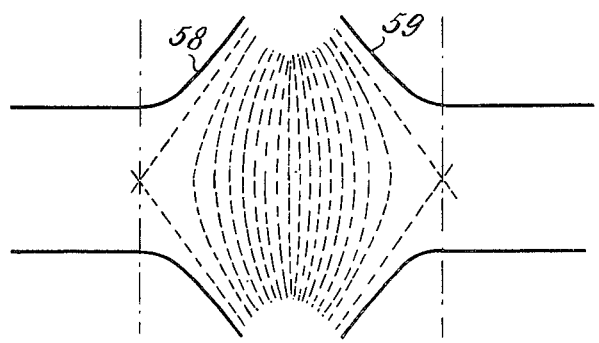
Fig. 14 shows a compound lens in which the electrodes or poles conform in part to portions of unparted hyperboloids.

A compound lens may be established by means of electrodes conforming to portions of unparted hyperboloids in place of electrodes conforming to sheets of biparted hyperboloids. The trace of the surfaces of the equipotential surfaces bounding the electrodes in such a lens are shown in Fig. 14. Two electrodes having conductive surfaces designated 58 and 59 are coaxially arranged. In their flaring portions they conform to unparted hyperboloids of eccentricity $$\sqrt{3}$$

To the left and right of the regions of minimum diameter of these hyperboloids the electrodes are continued as cylinders in order to keep the potential constant so that the rays of the electron beam may be propagated in straight lines.

Figure 15:
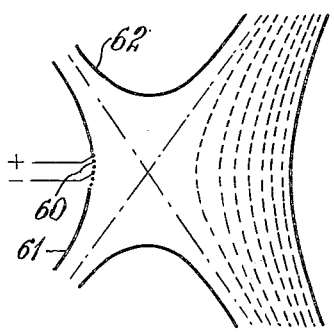
Fig. 15 shows the application of an emitting cathode to the surface of one of the hyperboloidal electrodes of an asymmetric lens.

In order to reduce the number of apertures, which always produce some distortion or aberration, it may be advantageous to introduce the emitting cathode directly on the hyperboloidal surface of one of the lateral electrodes. In Fig. 15 is shown a trace in a meridian plane of the electrodes of an asymmetric lens in which the emitting cathode 60 is introduced as a grid or spiral, shaped to the hyperboloidal surface of the lateral electrode 61. The annular electrode whose outline is shown as 62 concentrates the electrons emitted from the cathode 60 to a sharp focus despite the substantial size of the cathode 60. Thus the annular electrode constitutes a Wehnelt electrode of very favorable shape.

My invention is not limited to the particular structures shown in the drawings and described herein. All modifications thereof falling within the scope of the appended claims are to be understood as comprehended within these claims.

I claim:

1. An electrostatic system adapted to bring to a focus an axially symmetric beam of electrically charged particles, consisting of a plurality of electrodes having substantial symmetry in a common axis, the potentials of the said electrodes being determined for their respective positions by a potential field symmetric in the said axis in which the equipotential surfaces have substantially the shape of the members of two families of conjugate hyperboloids of revolution whose asymptotic cone has a generating angle of $$\tan^{-1}\sqrt{2}$$

2. An electron optical system adapted to focus an axially symmetric beam of electrically charged particles comprising a plurality of charged electrodes having substantial symmetry in a common axis, said electrodes presenting equipotential surfaces having substantially the shape of members of two families of conjugate hyperboloids of revolution whose asymptotic cone has a generating angle of $$\tan^{-1}\sqrt{2}$$

3. The method of focusing an axially symmetric beam of electrically charged rays which comprises arranging a plurality of axially symmetric electrodes in an axially symmetric array, orienting the said array with its axis of symmetry parallel with the direction of propagation of the beam to be focused, and connecting the said electrodes to points on a source of potential adapted to supply a plurality of potentials, the potentials of the said points being defined for the positions of the respective electrodes to which they are connected by the relation $$\phi = p\left(z^2 - \frac{r^2}{2}\right)$$

where $p$ is a constant, $z$ and $r$ are axial and radial coordinates of the respective electrodes in the space surrounding the said axis, $z$ being measured along the said axis from an origin fixed with reference to the said array, and $\phi$ is the potential referred to the potential existing at the said origin as zero potential.

4. An electrostatic electron lens having symmetry about an axis and comprising a plurality of electrodes each having symmetry about the said axis and providing in combination a substantial enclosure to a volume of revolution, except for apertures coaxial to the said axis; the said electrodes being charged to potentials varying with the axial and radial positions thereof according to the function $$\phi = p\left(z^2 - \frac{r^2}{2}\right)$$

in which $p$ is a constant, $z$ and $r$ are cylindrical coordinates for the space surrounding the said axis, and $\phi$ is the potential referred to the potential at the origin of the said coordinates as zero potential.

5. A device for influencing the individual rays of a beam of electrically charged rays including a plurality of electrodes having substantial symmetry in a common axis, a source of potential difference adapted to supply a plurality of potentials, and an electrically conductive connection from each of the said electrodes to a point on the said source of potential at which the potential is specified by the relation $$\phi = p\left(z^2 - \frac{r^2}{2}\right)$$

wherein $p$ is a constant, $z$ and $r$ are the axial and radial coordinates of the electrode, $r$ being measured from the axis of symmetry and $z$ being measured along the said axis from a chosen origin, and $\phi$ is the potential referred to the potential at the said origin as zero potential.

6. In electronic apparatus for producing an electron-optical image of an object to be investigated, the combination which includes a plurality of electrodes having substantial axial symmetry, insulating means for supporting the said electrodes with their axes of symmetry in coincidence, a source of potential difference adapted to supply a plurality of potentials, and electrically conductive connections from the said electrodes to the said source of potential whereby the said electrodes are charged to the potentials defined for their respective locations along and radially from the said axis by the function $$\phi = p\left(z^2 - \frac{r^2}{2}\right)$$

wherein $p$ is a constant, $z$ and $r$ are the axial and radial coordinates of the space surrounding the said axis, $z$ being measured from a chosen origin on the said axis, and $\phi$ is the potential referred to the potential existing at the said origin as zero potential.

7. An electrostatic electron lens comprising three electrodes of conductive material each shaped to conform at least in part to a surface of revolution about a common axis, one of the said electrodes conforming substantially in shape over a portion of its surface to an unparted hyperboloid of revolution asymptotic to a cone of generating angle $$\tan^{-1}\sqrt{2}$$

and the second and third of the said electrodes each substantially conforming in shape over a portion of its surface to a sheet of a biparted hyperboloid of revolution asymptotic to the same cone.

8. An electrostatic electron lens according to claim 7 in which the second and third electrodes are provided with apertures coaxial with the axis of revolution thereof.

9. An electron lens according to claim 8 in which the apertures are covered with films of electrically conductive material.

10. A convergent electrostatic electron optical system including three electrodes of conductive material each shaped to conform at least in part to a surface of revolution about a common axis, one of the said electrodes conforming substantially over a portion of its surface to an unparted hyperboloid of revolution asymptotic to a cone of generating angle $$\tan^{-1}\sqrt{2}$$

and the second and third of the said electrodes each conforming substantially over a portion of its surface to a sheet of a biparted hyperboloid of revolution asymptotic to the same cone, a source of electric potential difference, and conductive connections between the said source of potential and the said electrodes whereby the first electrode is maintained at a potential negative with respect to the potential of the second and third electrodes.

11. A divergent electrostatic electron optical system including three electrodes of conductive material each shaped to conform at least in part to a surface of revolution about a common axis, one of the said electrodes conforming substantially over a portion of its surface to an unparted hyperboloid of revolution asymptotic to a cone of generating angle $$\tan^{-1}\sqrt{2}$$

and the second and third of the said electrodes each conforming substantially over a portion of its surface to a sheet of a biparted hyperboloid of revolution asymptotic to the same cone, a source of electric potential difference, and conductive connections between the said source of potential and the said electrodes whereby the first electrode is maintained at a potential positive with respect to the potential of the second and third electrodes.

12. An electrostatic electron lens according to claim 7 in which the hyperboloidal sheets to which the second and third electrodes conform are the two sheets of a single biparted hyperboloid of revolution.

13. An electrostatic electron lens according to claim 12 wherein the generating hyperbola of the biparted hyperboloid to which the second and third electrodes conform has a major axis substantially equal to 0.63 times the major axis of the generating hyperbola of the unparted hyperboloid to which the first electrode conforms.

14. An electrostatic electron lens according to claim 12 wherein the generating hyperbola of the biparted hyperboloid to which the second and third electrodes conform has a major axis within the range of 0.2 to 1.5 times the major axis of the generating hyperbola of the unparted hyperboloid to which the first electrode conforms.

15. In an electrostatic electron lens including three electrodes composed of conductive material, a first electrode a portion of whose surface conforms substantially to an unparted hyperboloid of revolution asymptotic to a cone of generating angle $$\tan^{-1}\sqrt{2}$$

and a second and third electrode a portion of the surface of each of which conforms substantially to a sheet of a biparted hyperboloid of revolution asymptotic to the same cone, the said second and third electrodes each having an aperture coaxial with the common axis of revolution of the said hyperboloids and presenting to the axis in the vicinity of its aperture a surface of revolution generated in part by the rotation about the axis of a half circle convex toward the axis, the radius of the said circle being not more than $r/2$, where $r$ is the minimum radius of the aperture.

16. In an electrostatic electron microscope including an electron gun producing a beam of electrons having substantially uniform velocity along the axis of the beam, an electrostatic electron lens comprising three electrodes composed of conductive material, of which one has substantially the form of a portion of an unparted hyperboloid of revolution asymptotic to a cone of generating angle $$\tan^{-1}\sqrt{2}$$

and of which the other two electrodes each have substantially the form of a portion of a sheet of a biparted hyperboloid of revolution asymptotic to the same cone, the first of said electrodes being conductively connected to the cathode of the electron gun, the second and third electrodes being conductively connected together, and the said unparted and biparted hyperboloids having respectively a minimum diameter and a separation of the vertices in the ratio of substantially 1.0 to 0.63.

17. An electrostatic electron lens comprising a plurality of conducting rings spaced coaxially to a given axis and charged to potentials approximating those defined by the function $$\phi = p\left(z^2 - \frac{r^2}{2}\right)$$

wherein $p$ is a constant, $z$ and $r$ are cylindrical coordinates of the space surrounding the said axis, and $\phi$ is the potential referred to the potential at the origin of the said coordinates as zero potential.

18. An electrostatic electron lens including a plurality of conducting rings coaxially arranged, the said rings being of substantially equal diameter, and two electrodes composed of conductive material each conforming over a portion of its surface substantially to a sheet of a biparted hyperboloid of revolution asymptotic to a single cone of generating angle $$\tan^{-1}\sqrt{2}$$

coaxial to the axis of the said rings.

19. A magnetic electron lens comprising a first magnetic pole composed of magnetically permeable material and having a surface approximating in part to an unparted hyperboloid of revolution whose asymptotic cone has a generating angle of $$\tan^{-1}\sqrt{2}$$

a second and a third magnetic pole composed of magnetically permeable material each having a surface approximating in part to one of the sheets of a biparted hyperboloid of revolution asymptotic to the same cone, and a source of magnetic potential difference establishing a common difference of magnetic potential between the second and third poles on the one hand and the first pole on the other.

20. A convergent electromagnetic electron lens system including three poles of permeable material each shaped to conform at least in part to a surface of revolution about a common axis, one of the said poles conforming substantially over a portion of its surface to an unparted hyperboloid of revolution asymptotic to a cone of generating angle $$\tan^{-1}\sqrt{2}$$

and the second and third of the said poles each conforming substantially over a portion of its surface to a sheet of a biparted hyperboloid of revolution asymptotic to the same cone, and means for establishing differences of magnetic potential between the first of the said poles and the second and third of said poles whereby the first pole is maintained at a magnetic potential negative with respect to the potential of the second and third poles.

21. A divergent electromagnetic electron lens system including three poles of permeable material each shaped to conform at least in part to a surface of revolution about a common axis, one of the said poles conforming substantially over a portion of its surface to an unparted hyperboloid of revolution asymptotic to a cone of generating angle $$\tan^{-1}\sqrt{2}$$

and the second and third of the said poles each conforming substantially over a portion of its surface to a sheet of a biparted hyperboloid of revolution asymptotic to the same cone, and means for establishing differences of magnetic potential between the first of the said poles and the second and third of said poles whereby the first pole is maintained at a magnetic potential positive with respect to the potential of the second and third poles.

22. The method of focusing a beam of electrically charged particles symmetric in a plane which comprises subjecting the beam to a potential field in which the equipotential surfaces approximate to hyperbolic cylinders generated on the members of two families of conjugate rectangular hyperbolas, and maintaining the direction of propagation of the beam incident upon the field parallel to one of the asymptotes of the said hyperbolas.

23. A device adapted to bring to a line focus a beam of electrically charged particles symmetric in a plane, including a plurality of electrodes symmetric in a common plane, the said electrodes being charged to the potentials defined for their positions by a potential field symmetric in the said common plane in which the equipotential surfaces have substantially the shape of hyperbolic cylinders whose directrices are the members of two families of conjugate rectangular hyperbolas one of whose asymptotes lies in the said common plane.

24. A device adapted to bring to a line focus a beam of electrically charged particles symmetric in a plane, consisting of a plurality of poles symmetric in a common plane, the said poles being charged to the potentials required for their positions by a potential field symmetric in the said common plane in which the equipotential surfaces have substantially the shape of hyperbolic cylinders whose directrices are the members of two families of conjugate rectangular hyperbolas one of whose asymptotes lies in the said common plane.

25. An electrostatic electron lens composed of three electrodes each bounded at least in part by a surface of revolution, the said surfaces of revolution having a common axis, said three electrodes each having an aperture coaxial to the said axis, the aperture of the central one of the said electrodes being bounded at least in part by a surface of revolution generated by a curve convex toward the said axis whose radius of curvature at its point of closest approach to the said axis is equal to one-half the separation of the said point from the said axis, the aperture of each of the other of the said electrodes being bounded by a surface of revolution whose generatrix is in each case a curve convex towards the said axis and having a maximum radius of curvature not greater than the minimum separation of the said curve from the said axis, the said outer electrodes being each further bounded in part on the side presented to the central electrode by a spherical surface whose radius in each case is equal to twice the separation of the intersection with the said axis of the said spherical surface from the plane perpendicular to the said axis passing through the point of closest approach to the said axis on the generatrix of the aperture of the central electrode.

26. A device adapted to bring to a focus an axially symmetric beam of electrically charged particles comprising a plurality of elements having substantial symmetry in a common axis, and means to charge the said elements to potentials determined for their respective positions by a potential field symmetric in the said axis in which the equipotential surfaces have substantially the shape of members of two families of conjugate hyperboloids of revolution whose asymptotic cone has a generating angle of $$\tan^{-1}\sqrt{2}$$

27. An electron lens comprising a plurality of electron-influencing elements having substantial symmetry in a common axis, the potentials of the said elements being determined for their respective positions by a potential field symmetric in the said axis in which the equipotential surfaces have substantially the shape of members of two families of conjugate hyperboloids of revolution whose asymptotic cone has a generating angle of $$\tan^{-1}\sqrt{2}$$

28. An electron lens comprising a plurality of electron-influencing elements having substantial symmetry in a common axis, and means to charge each of the said elements to a potential defined for its location by the relation $$\phi = p\left(z^2 - \frac{r^2}{2}\right)$$

in which $p$ is a constant, $z$ and $r$ are the radial and axial coordinates of the element, $r$ being measured from the axis of symmetry and $z$ being measured along the said axis from a chosen origin, and wherein $\phi$ is the potential referred to the potential at the said origin as zero.

29. An electron optical system adapted to focus an axially symmetrical beam of electrically charged particles comprising a plurality of electron-influencing elements having substantial symmetry in a common axis, the said elements presenting equipotential surfaces having substantially the shape of members of two families of conjugate hyperboloids of revolution whose asymptotic cone has a generating angle of $$\tan^{-1}\sqrt{2}$$

30. An electron lens adapted to focus an axially symmetrical beam of electrically charged particles comprising three electron-influencing elements each bounded at least in part by a surface of revolution, the said surfaces of revolution having a common axis, said three elements each having an aperture coaxial to the said axis, the aperture of the central one of the said elements being bounded at least in part by a surface of revolution generated by a curve convex toward the said axis whose radius of curvature at its point of closest approach to the said axis is equal to one-half the separation of the said point from the said axis, the aperture of each of the other of the said elements being bounded by a surface of revolution whose generatrix is in each case a curve convex towards the said axis and having a maximum radius of curvature not greater than the minimum separation of the said curve from the said axis, the said outer elements being each further bounded in part on the side presented to the central element by a spherical surface whose radius in each case is equal to twice the separation of the intersection with the said axis passing through the point of closest approach to the said axis on the generatrix of the aperture of the central element.

31. An electromagnetic electron lens composed of three poles of permeable material each bounded at least in part by a surface of revolution, the said surfaces of revolution having a common axis, said three poles each having an aperture coaxial to the said axis, the aperture of the central one of the said poles being bounded at least in part by a surface of revolution generated by a curve convex toward the said axis whose radius or curvature at its point of closest approach to the said axis is equal to one-half the separation of the said point from the said axis, the aperture of each of the other of the said poles being bounded by a surface of revolution whose generatrix is in each case a curve convex towards the said axis and having a maxium radius or curvature not greater than the minimum separation of the said curve from the said axis, the said outer poles being each further bounded in part on the side presented to the central pole by a spherical surface whose radius in each case is equal to twice the separation of the intersection with the said axis of the said spherical surface from the plane perpendicular to the said axis passing through the point of closet approach to the said axis on the generatrix of the aperture of the central pole.

REINHOLD RUDENBERG.

REFERENCES CITED

The following references are of record in the file of this patent:

UNITED STATES PATENTS

| Number | Name | Date |
|---|---|---|
| 2,124,270 | Broadway | July 19, 1938 |
| 2,172,735 | Knoll | Sept. 12, 1939 |
| 2,179,916 | Bouwers | Nov. 14, 1939 |
| 2,277,414 | Ramo | Mar. 24, 1942 |
| 2,289,071 | Ramo | July 7, 1942 |
| 2,318,418 | Pierce | May 4, 1943 |
| 2,318,423 | Samuel | May 4, 1943 |

Certificate of Correction

Patent No. 2,520,813 August 29, 1950

REINHOLD RUDENBERG

It is hereby certified that error appears in the printed specification of the above numbered patent requiring correction as follows:

Column 5, line 75, for the word "and" read *the*; column 7, line 51, for that portion of the equation reading "$\phi Z$" read $\phi_z$; line 53, for "$\phi R$" read $\phi_R$; line 57 for "$\phi Z - \phi R$" read $\phi_z - \phi_R$; column 8, line 60, for "$B^2$" read $R^2$; column 9, line 13, for "my given R with" read *any given R will*; column 10, lines 13 and 14, strike out "apertures will be as before so that the surface of the lateral"; column 14, line 16, after "are" insert *the*; and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*